C. E. GRIFFIN.
SOIL PULVERIZER.
APPLICATION FILED APR. 26, 1909.
936,712.
Patented Oct. 12, 1909.
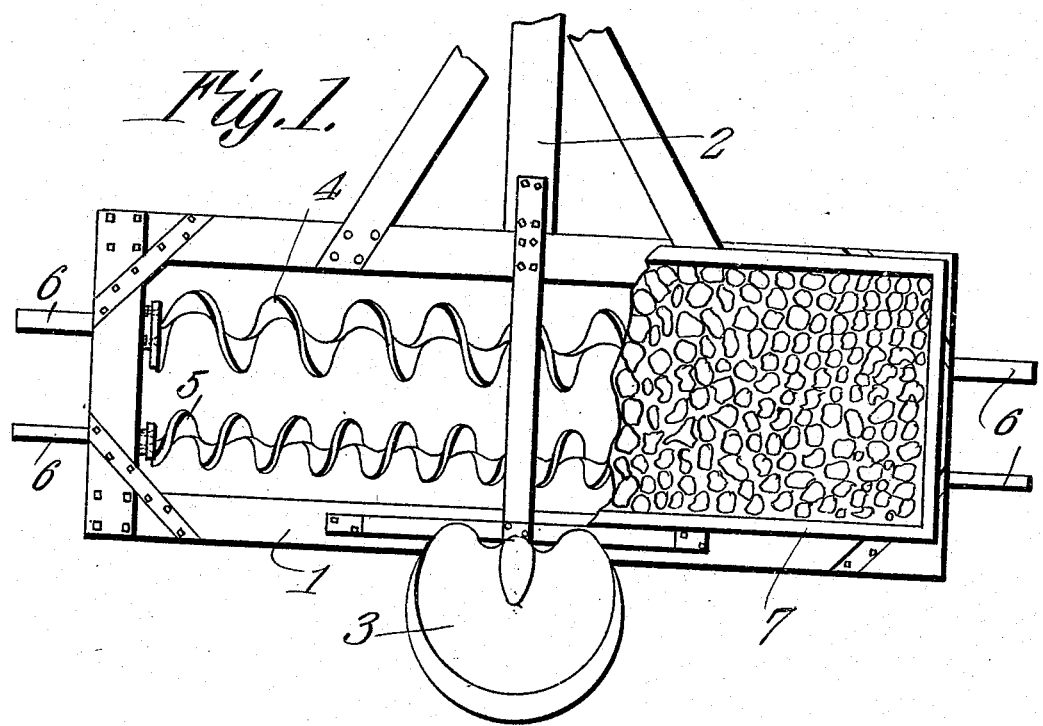
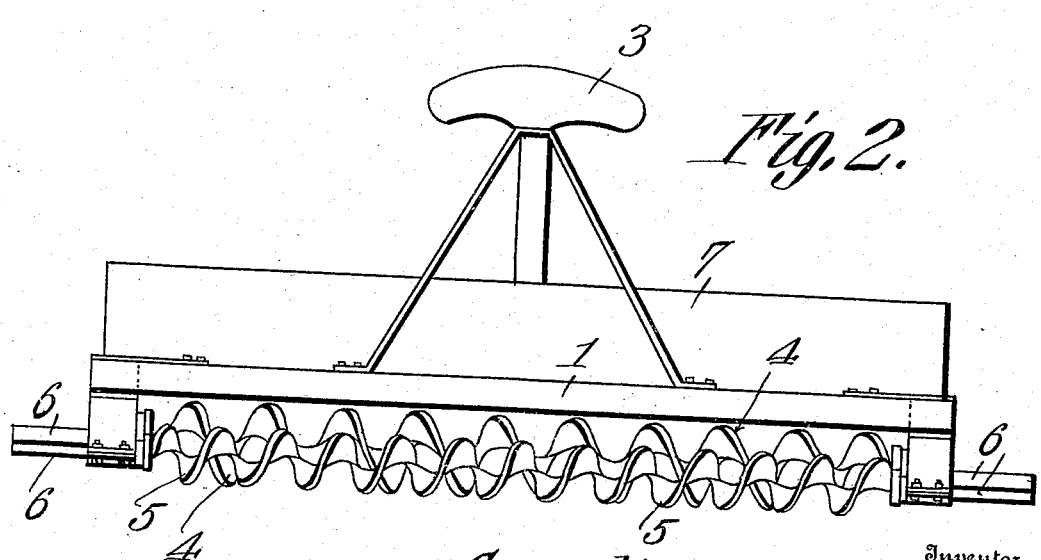
Cornelius E. Griffin, Inventor

UNITED STATES PATENT OFFICE.

CORNELIUS E. GRIFFIN, OF GLENDIVE, MONTANA.

SOIL-PULVERIZER.

936,712.　　　　Specification of Letters Patent.　　Patented Oct. 12, 1909.

Application filed April 26, 1909. Serial No. 492,182.

*To all whom it may concern:*

Be it known that I, CORNELIUS E. GRIFFIN, a citizen of the United States, residing at Glendive, in the county of Dawson and State of Montana, have invented a new and useful Soil-Pulverizer, of which the following is a specification.

This invention relates to machines for pulverizing soil and is particularly designed for use upon a field after the same has been plowed up.

The object of the invention is to provide a machine of this character which is simple and durable in construction and which is provided with novel means for positively breaking up clods of dirt without however packing the loose dirt.

Another object is to provide a device of this character which does not necessitate the use of gearing or other power-transmitting means for actuating the pulverizing mechanism.

A still further object is to provide a machine of this type which can be conveniently transported from place to place.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a plan view of the machine, a portion of the weight being removed. Fig. 2 is a rear elevation of the machine.

Referring to the figures by characters of reference 1 designates a frame preferably rectangular in outline and provided with a draft tongue 2 and a driver's seat 3.

Arranged within the frame 1 and extending from end to end thereof are front and rear spiral rollers 4 and 5 respectively, said rollers being parallel and the front roller 4 being preferably of greater diameter than the rear roller 5. Each of these rollers is preferably formed by twisting an elongated metal plate, although it is to be understood that the same may be constructed in any other preferred manner. Each of the rollers has trunnions or necks 6 extending from its ends and journaled within the opposite portions of frame 1, said trunnions extending beyond the frame and being designed to be engaged by supporting wheels (not shown) for the purpose of facilitating the transportation of the machine from place to place without bringing the rolls 4 and 5 into contact with the ground. The two rollers are preferably so located that their lowermost portions will contact with the ground while the frame 1 is horizontal. This has been clearly indicated in Fig. 2. In order that the machine may press upon the ground sufficiently to cause the desired pulverizing of the soil, a box or other receptacle 7 is mounted on the frame 1 and designed to be filled with stones or other objects, so that any desired weight can be given the machine. A portion of this box, and the material therein, has been shown in Fig. 1.

As heretofore stated, this machine can be mounted upon wheels and drawn from place to place. When it is desired to use the machine for pulverizing soil, the wheels are removed so as to permit the rollers 4 and 5 to rest upon the ground. The machine is then drawn forward and the front roller 4 will cut into and break up the clods in the path thereof, and the other roller 5 following it will cut up those parts of the clods left unbroken by the front roller. Inasmuch as the two rollers are of different diameters they will rotate at different speeds, and therefore more efficiently pulverize the soil than would otherwise be the case.

It is of course to be understood that various changes made be made in the construction and arrangement of the parts of the machine without departing from the spirit of the present invention.

What is claimed is:—

1. A soil pulverizer comprising spiral parallel supporting rollers of different diameters, and a structure supported by and connecting the rollers.

2. A soil pulverizer comprising spiral parallel rollers of different diameters and a weighted structure connecting and supported by the rollers.

3. A soil pulverizer comprising parallel spiral rollers of different diameters, a frame supported by and connecting the rollers, and wheel-engaging trunnions extending from the rollers and beyond opposite portions of the frame.

4. A soil pulverizer comprising parallel spiral rollers of different diameters, a structure supported by and connecting the rollers, wheel-engaging trunnions extending from opposite ends of the rollers and beyond the structure, and a weight-holding receptacle mounted upon the structure.

5. A soil pulverizer including a front spiral, a rear spiral parallel therewith and of less diameter than the front spiral, and a structure supported by and connecting the spirals, said spirals being reversely pitched.

6. A soil pulverizer comprising a front spiral, a rear spiral parallel with and of less diameter than the front spiral, trunnions extending from the spirals and constituting wheel engaging portions and a weighted frame mounted upon the trunnions, the two spirals being oppositely pitched and having their lowermost portions in a plane parallel with the frame.

In testimony that I claim the foregoing as my own, I have hereto affixed my signature in the presence of two witnesses.

CORNELIUS E. GRIFFIN.

Witnesses:
C. C. HURLEY,
H. N. DION.